J. SWAN.
AUGER-HANDLE.

No. 170,413.  Patented Nov. 23, 1875.

UNITED STATES PATENT OFFICE.

JAMES SWAN, OF SEYMOUR, CONNECTICUT.

IMPROVEMENT IN AUGER-HANDLES.

Specification forming part of Letters Patent No. 170,413, dated November 23, 1875; application filed March 9, 1875.

*To all whom it may concern:*

Be it known that I, JAMES SWAN, of Seymour, in the county of New Haven and State of Connecticut, have invented an Improvement in Auger-Handles; and I do hereby declare the following, when taken in connection with the accompanying drawings and the letters of reference marked thereon, to be a full, clear, and exact description of the same, and which said drawings constitute part of this specification, and represent, in—

Figure 1:
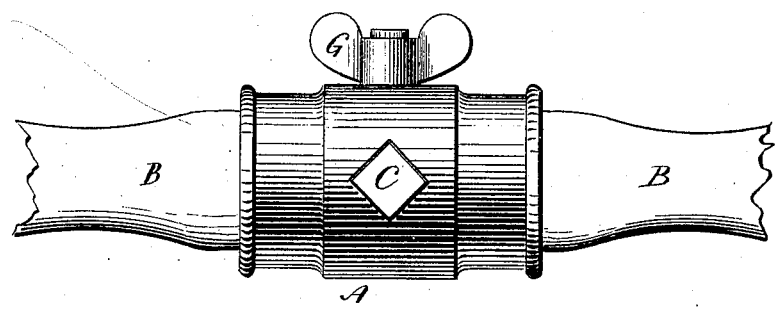
Figure 2:
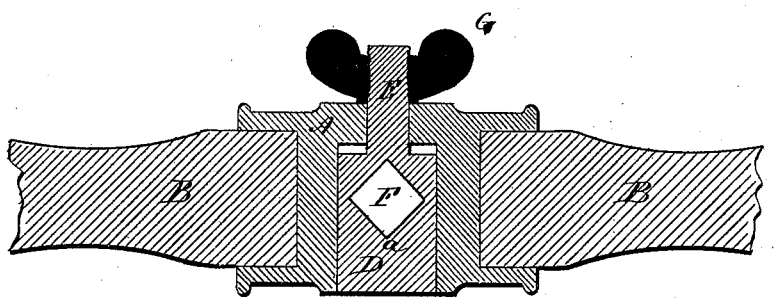

Figure 1, top view; Fig. 2, longitudinal central section.

This invention relates to an improvement in that class of auger-handles in which a device is employed to secure one auger, so that it may be easily removed and a second introduced.

The invention consists in a central socket formed to receive the handle whole or in two parts, and with a vertical central perforation through which to insert the tang of the auger, combined with a plate working in a mortise at right angles to the perforation in the socket, the said plate perforated to substantially correspond to the perforation in the socket, and a nut upon the outside of the socket to draw the said plate into the mortise across the perforation, so that one angle of the perforation in the plate will clamp the tang in the opposite angle of the socket, as more fully hereinafter described.

A is the socket, formed to receive the handles B, and with the vertical central perforation C through which the tang of the auger may be set. At right angles to the perforation C a mortise is formed, into which a plate, D, is set, so as to work freely therein, the said plate constructed with a screw, E, upon one end to pass through the socket upon the side opposite the mortise, as seen in Fig. 2, and also constructed with a perforation, F, corresponding to the perforation C of the socket. Outside the socket a nut, G, is applied to the screw E, so that by turning the nut onto the screw the plate D will be drawn toward that side of the socket, or unscrewing the nut the plate will be free to move in the opposite direction. This completes the construction.

Figure 3:
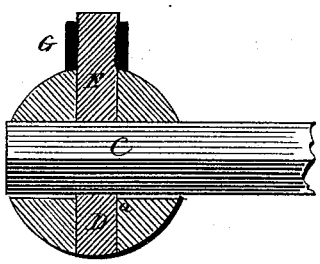

The operation is as follows: The plate D is left so free that its perforation will coincide with the perforation of the socket. In this condition the tang is passed through the socket and plate, and then the nut turned onto the screw to draw the plate D against the tang, as seen in Fig. 3, the angle *a* in the plate clamping the tang hard against the opposite angle of the socket.

I do not broadly claim the socket of an auger-handle provided with a device for clamping the tang of the auger, as such I am aware is not new. I am aware of Patent No. 110,920, and do not wish to be understood as claiming anything contained in said patent; but What I do claim as my invention is—

As an article of manufacture, the herein-described auger-handle, consisting of the socket A, constructed to receive the handle B, and with the perforation C, combined with the transverse perforated plate D, constructed with the screw E extending through one side of the socket, and provided with the nut G outside the socket, substantially as set forth.

JAMES SWAN.

Witnesses:
G. W. DIVINE,
CHS. BAY.